(12) United States Patent
Hsieh

(10) Patent No.: US 7,256,338 B2
(45) Date of Patent: Aug. 14, 2007

(54) MUSICAL INSTRUMENT BRACKET ASSEMBLY

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 198 days.

(21) Appl. No.: 11/125,957

(22) Filed: May 9, 2005

(65) Prior Publication Data

US 2006/0249007 A1   Nov. 9, 2006

(51) Int. Cl.
*G10D 13/02* (2006.01)
(52) U.S. Cl. .......................................... 84/421; 248/170
(58) Field of Classification Search ............... 84/421, 84/327, 453; 248/170, 125.1, 125.8, 157, 248/177.1

See application file for complete search history.

(56) References Cited

U.S. PATENT DOCUMENTS 6,109,573 A * 8/2000 Liao et al. .................. 248/170

6,814,332 B2 * 11/2004 Eason ....................... 248/122.1

\* cited by examiner

*Primary Examiner*—Lincoln Donovan
*Assistant Examiner*—Jianchun Qin
(74) *Attorney, Agent, or Firm*—patentm.us; James H. Walters

(57) ABSTRACT

A musical instrument bracket assembly is mounted on a top end of a post and has a base, a pivot bracket, a pivot pin, a compression knob and a standoff rod. The base has a tongue. The pivot bracket is mounted pivotally on the tongue and has a standoff hole, two pivot wings, a gap and a stationary compression fitting. The pivot wings extend down from the standoff hole and are mounted pivotally on opposite sides of the tongue. The stationary compression fitting is formed on one of the pivot wings. The pivot pin extends through the pivot wings and the base. The compression knob is attached to the pivot pin and has a rotatable compression fitting corresponding to the stationary compression fitting. When the compression knob is turned to an adjusting position, the compression fittings release the pivot bracket and the standoff rod with a single action.

3 Claims, 6 Drawing Sheets

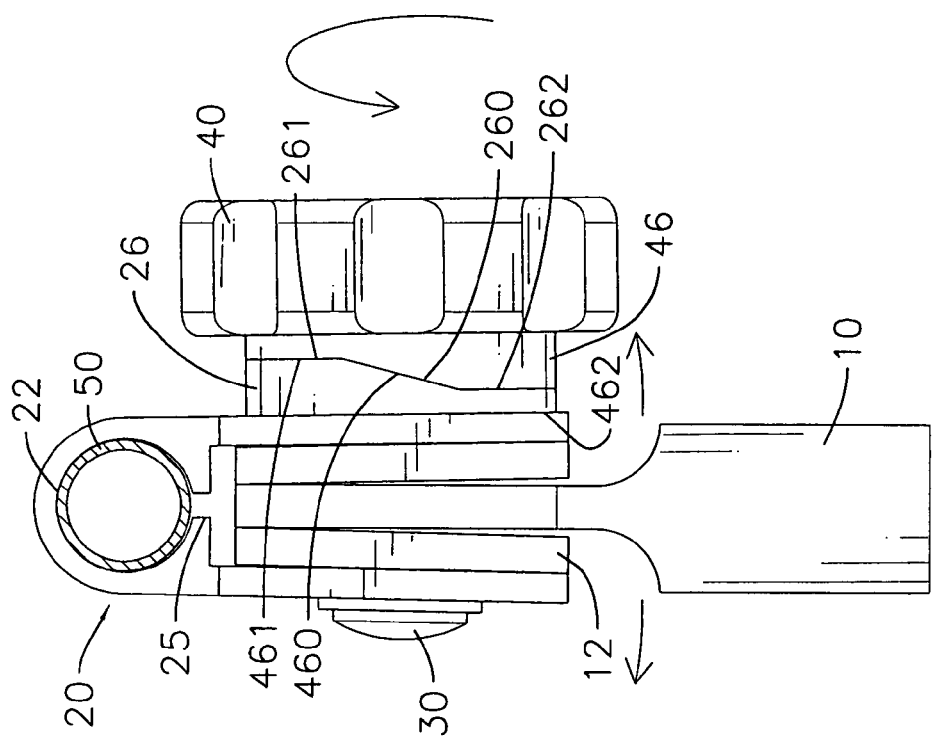
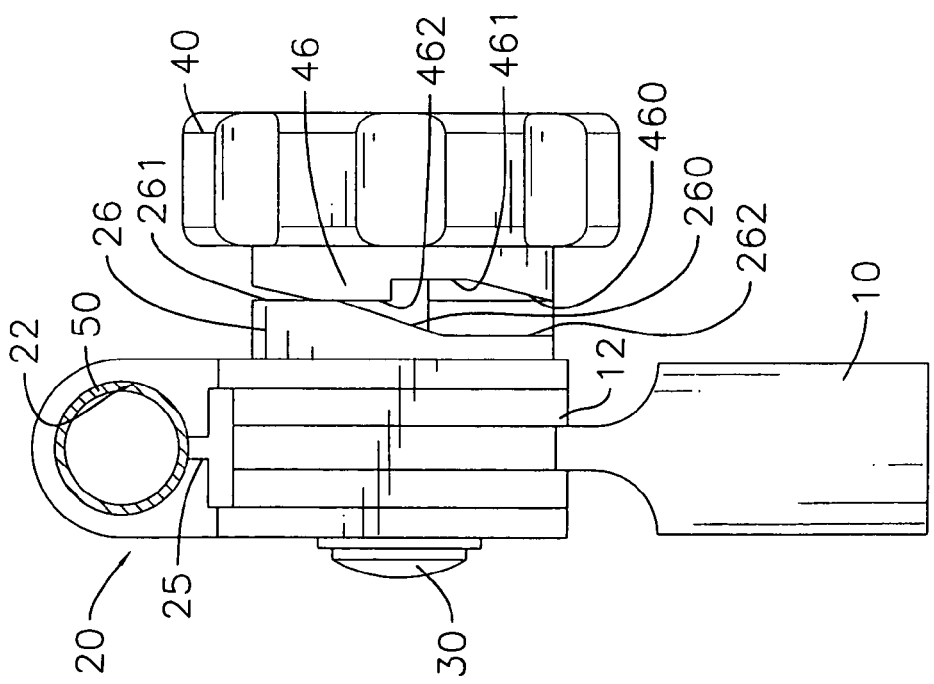

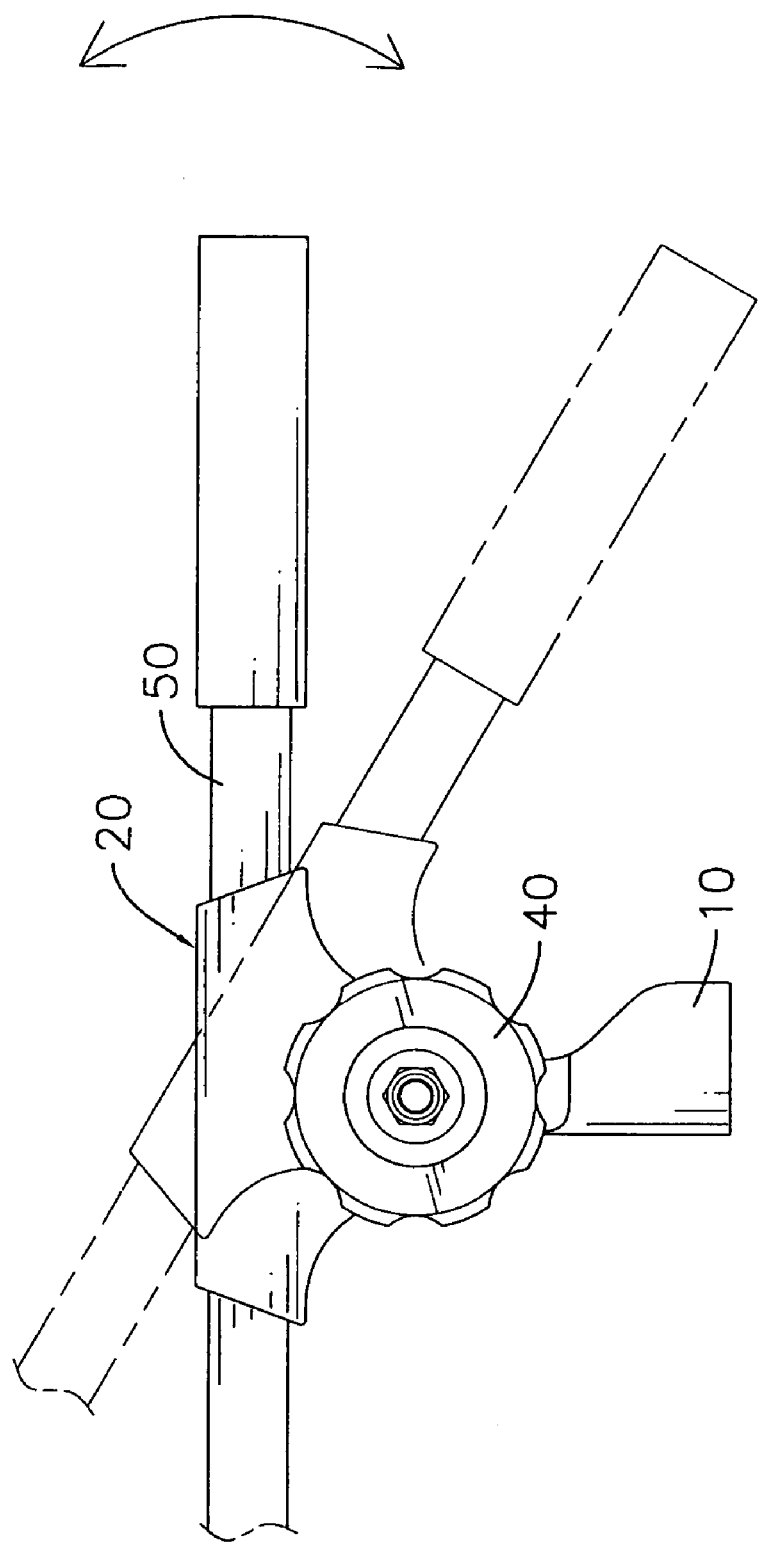

MUSICAL INSTRUMENT BRACKET ASSEMBLY

BACKGROUND OF THE INVENTION

1. Field of the Invention

The present invention relates to a bracket assembly, and more particularly to a musical instrument bracket assembly that holds a cymbal or atom-tom.

2. Description of Related Art

With reference to FIG. 7, a conventional musical instrument bracket assembly to hold a musical instrument such as a cymbal or a tom-tom is mounted on a top end of a post (80) and has a base (60) and a pivot bracket (70).

The base (60) is mounted on the top end of the post (80) and has a pivot hole defined through the base (60).

The pivot bracket (70) is mounted pivotally on the base (60) and has a tube (71), a pivot pin (73), a compression knob elevation clamp (74), a standoff rod (75) and a compression knob standoff clamp (72).

The tube (71) has a central hole, a transverse threaded hole and two pivot wings (713). The central hole is defined longitudinally through the tube (71). The transverse threaded hole is defined transversely through the tube (71). The pivot wings (713) are formed on the tube (71), extend down in parallel and are connected pivotally to the base (60). Each pivot wing (713) has a pivot hole defined through the pivot wing (713).

The pivot pin (73) extends through the pivot holes in the pivot wings (713) on the tube (71) and the pivot hole in the base (60) and has an outer thread.

The compression knob elevation clamp (74) is hollow, screws onto the pivot pin (73), abuts one of the pivot wings (713) and has a proximal end, a distal end, an inner thread and a handle (740). The inner thread corresponds to the outer thread on the pivot pin (73) and is formed at the proximal end of the elevation clamp (74). The handle (740) is a rod transversely mounted slidably through the compression knob elevation clamp (74) at the distal end of the elevation clamp (74).

The standoff rod (75) is mounted slidably through the central hole in the tube (71) and has two ends. One end is detachably connected to a cymbal or a tom-tom.

The compression knob standoff clamp (72) has a bolt and a knob. The bolt is mounted in the transverse threaded hole in the tube (71) and has a proximal end and a distal end. The proximal end selectively presses tightly against the standoff rod (75) to hold the standoff rod (75) in position. The knob is attached to the distal end of the bolt.

To adjust the position of a musical instrument, the compression knob standoff clamp (72) and the elevation clamp (74) must be individually loosened and tightened after the standoff rod (75) and the pivot bracket (70) are adjusted.

However, separately operating the compression knob standoff clamp (72) and the orientation duster (74) is inconvenient and time consuming.

To overcome the shortcomings, the present invention provides a musical instrument bracket assembly to mitigate or obviate the aforementioned problems.

SUMMARY OF THE INVENTION

The main objective of the invention is to provide a bracket assembly to hold a musical instrument. The bracket assembly has a standoff rod and a compression knob that operate simultaneously when the elevation and standoff of a musical instrument on the standoff rod are adjusted.

A musical instrument bracket assembly in accordance with the present invention is mounted on a top end of a post and comprises a base, a pivot bracket, a pivot pin, a compression knob and a standoff rod.

The base is mounted on the top end of the post and has a tongue.

The pivot bracket is mounted pivotally on the tongue and has a standoff hole, two pivot wings, a gap and a stationary compression fitting. The pivot wings extend from the pivot bracket and are mounted pivotally on opposite sides of the tongue of the base. The gap is defined between the pivot wings and communicates with the standoff hole. The stationary compression fitting is formed on one of the pivot wings.

The pivot pin extends through the pivot wings and the base.

The compression knob is attached to the pivot pin and has a rotatable compression fitting corresponding to the stationary compression fitting of the pivot bracket.

Other objectives, advantages and novel features of the invention will become more apparent from the following detailed description when taken in conjunction with the accompanying drawings.

BRIEF DESCRIPTION OF THE DRAWINGS

FIG. 3 is an operational end view in partial section of the musical instrument bracket assembly in FIG. 1 with the compression knob squeezing the pivot bracket;

FIG. 4 is an operational end view in partial section of the musical instrument bracket assembly in FIG. 3 with the compression knob releasing the pivot bracket;

FIG. 5 is an operational side view of the musical instrument bracket assembly in FIG. 1 with the pivot bracket pivoting on the base;

DETAILED DESCRIPTION OF PREFERRED EMBODIMENT

Figure 1:
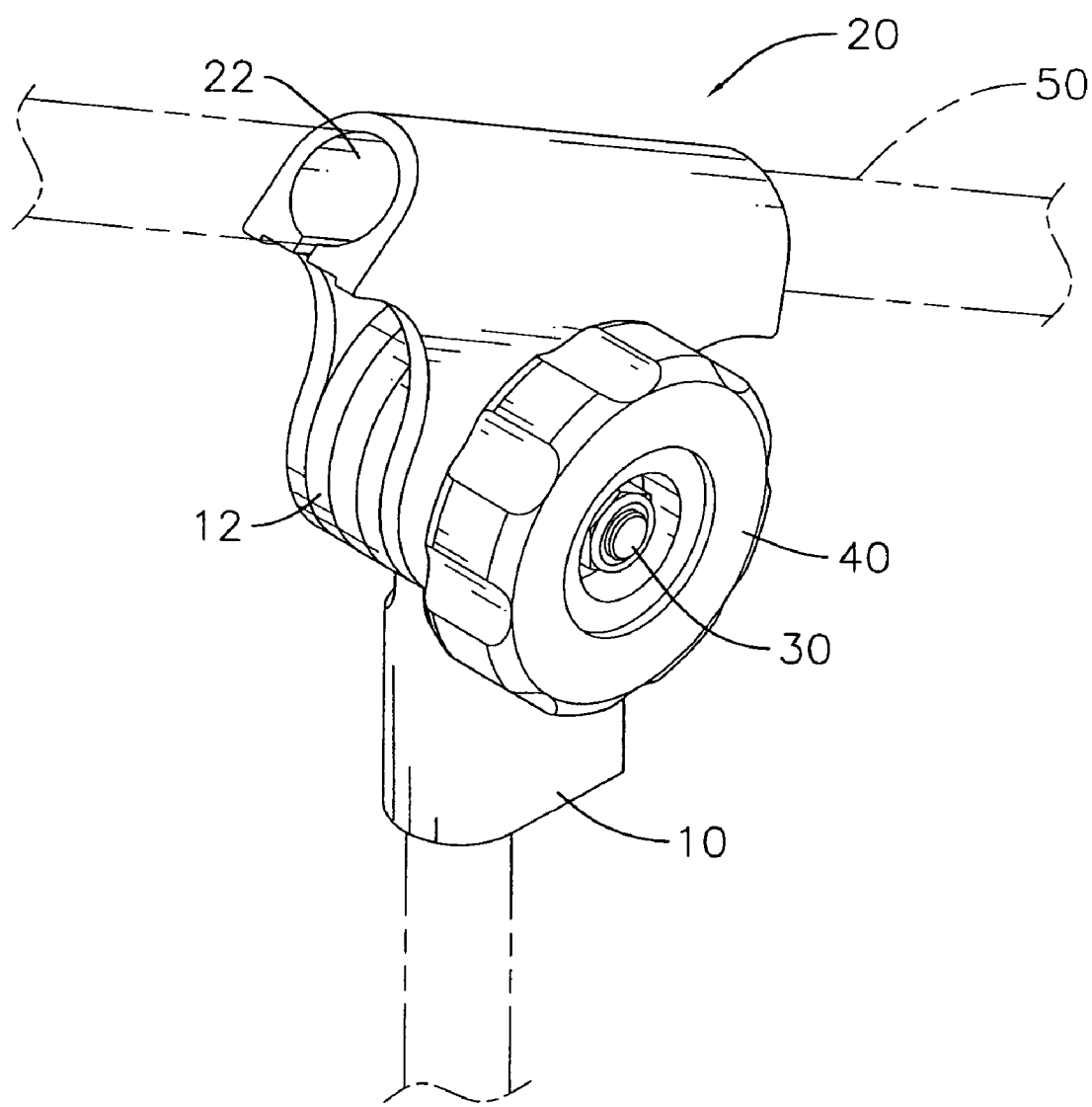
FIG. 1 is a perspective view of a musical instrument bracket assembly in accordance with the present invention.
Figure 2:
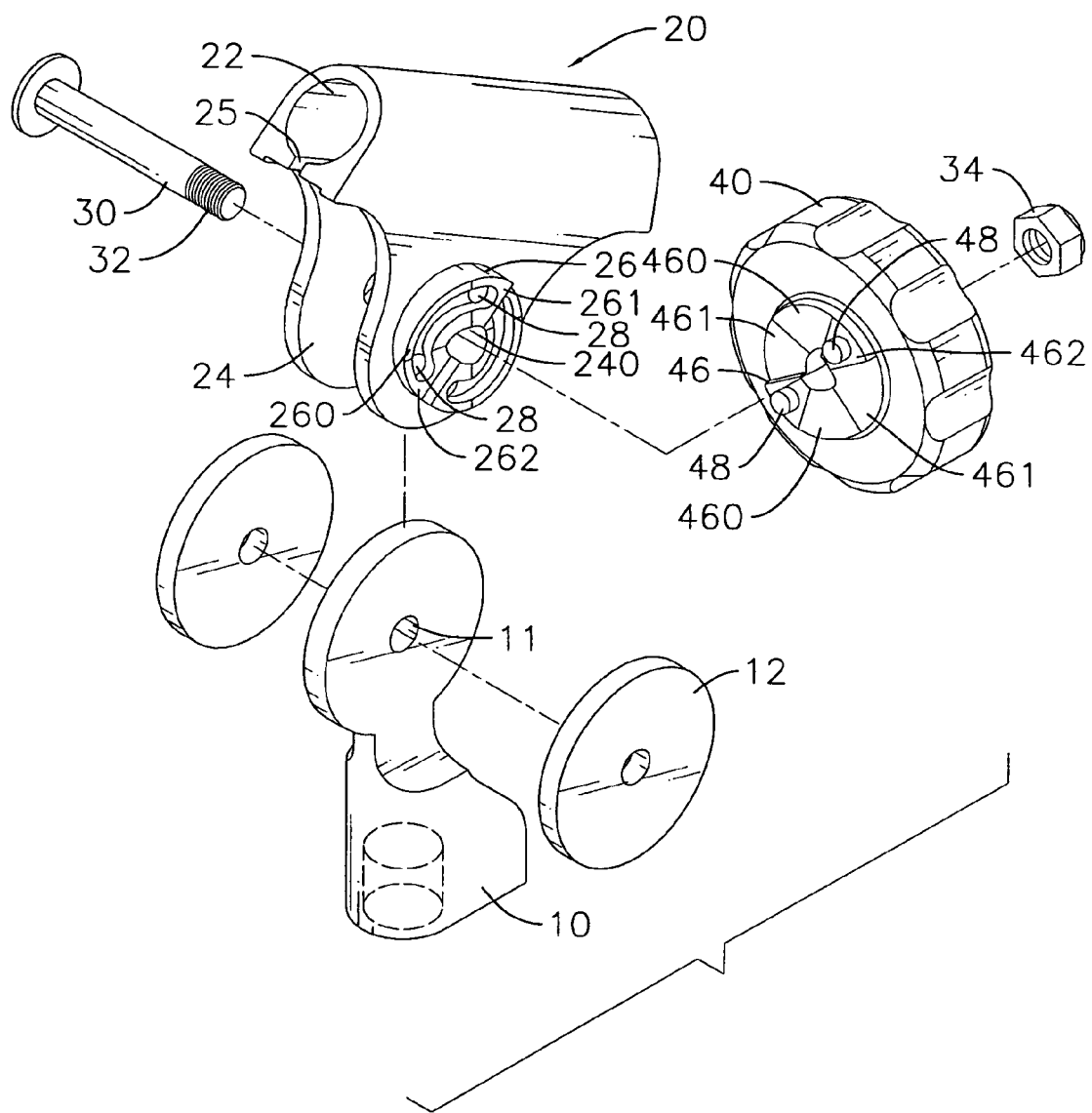
FIG. 2 is an exploded perspective view of the musical instrument bracket assembly in FIG. 1.
Figure 6:
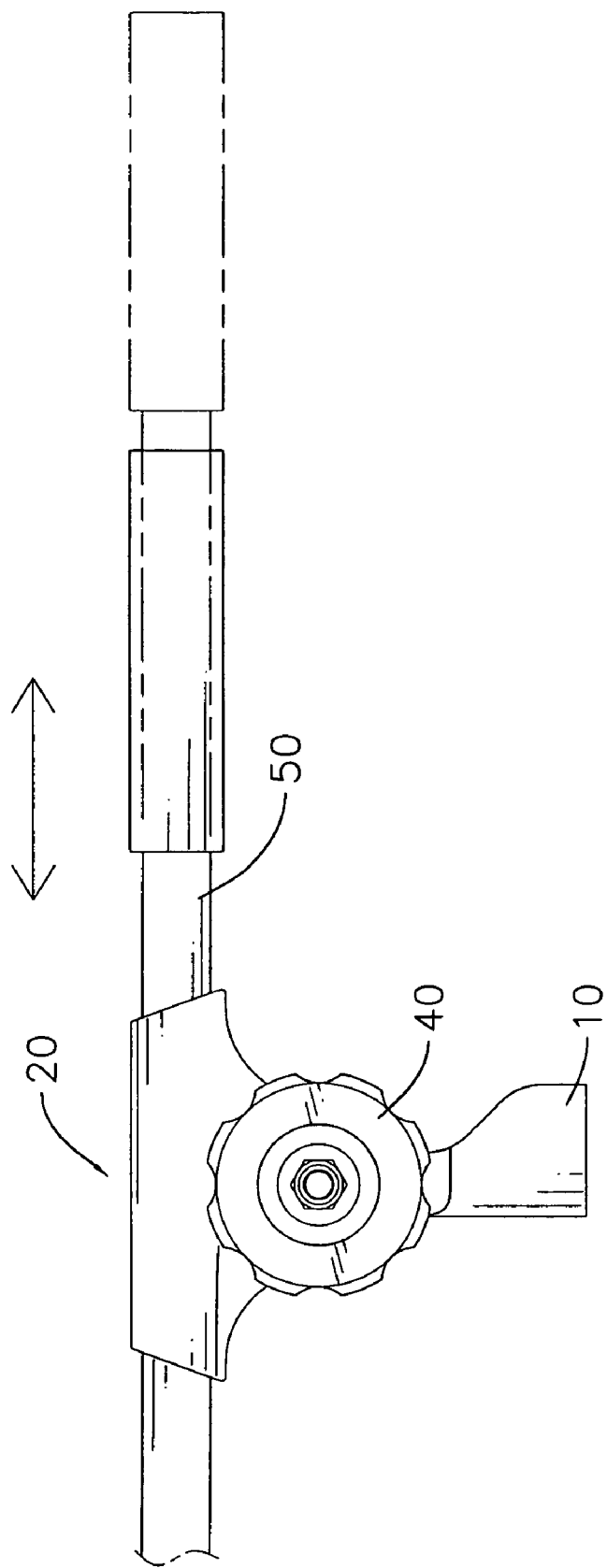
FIG. 6 is an operational side view of the musical instrument bracket assembly in FIG. 5 with the standoff rod sliding in the standoff hole.
Figure 7:
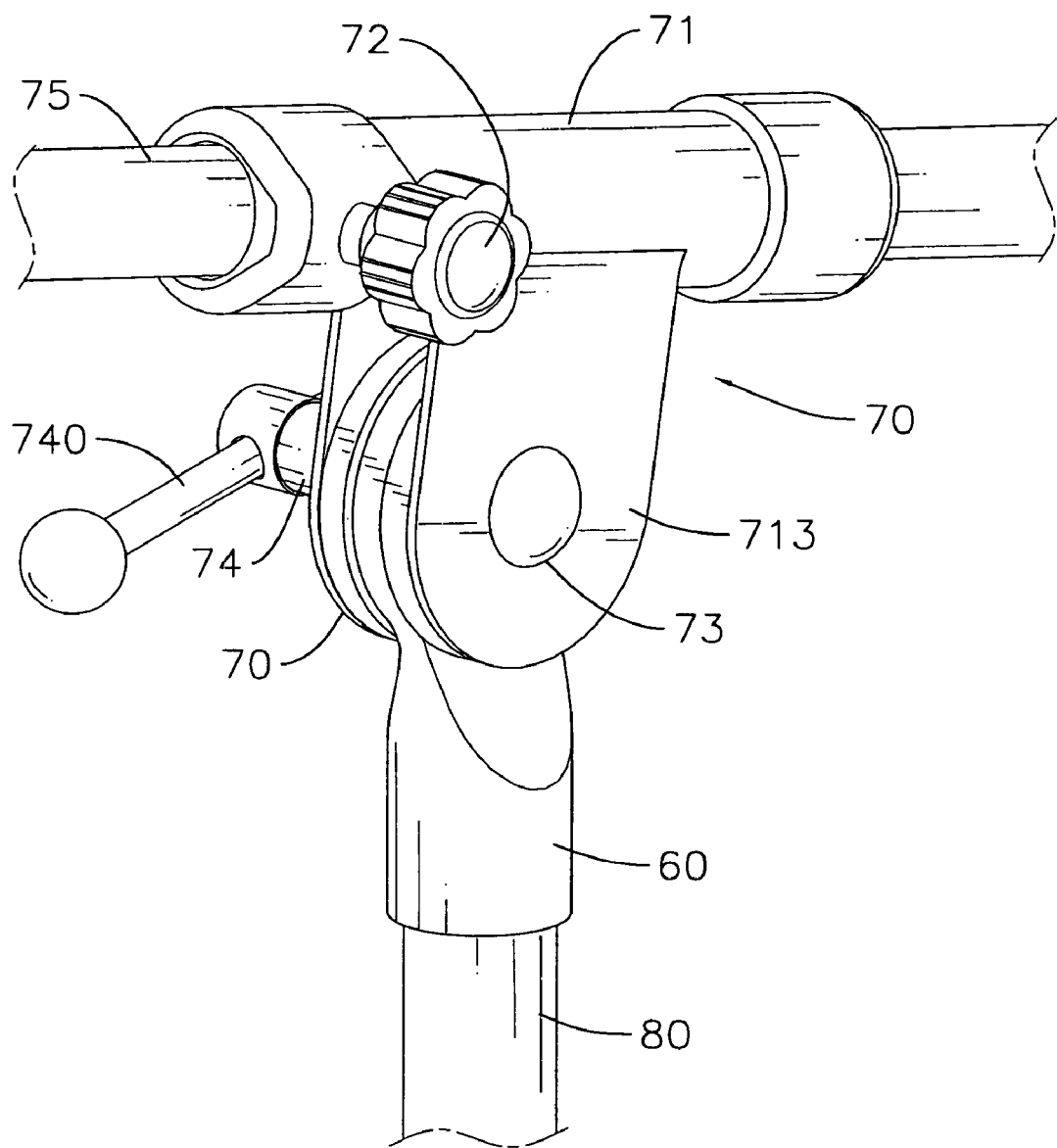
FIG. 7 is a perspective view of a conventional musical instrument bracket assembly in accordance with the prior art.

With reference to FIGS. 1 and 2, a musical instrument bracket assembly in accordance with the present invention is mounted on a top end of a post to hold a musical instrument such as a cymbal or tom-tom.

The musical instrument bracket assembly comprises a base (10), a pivot bracket (20), a pivot pin (30), two slip-proof gaskets (12), a compression knob (40) and a standoff rod (50).

The base (10) is mounted on the top end of the post and has an upper end, a lower end, a mounting hole and a pivot tongue. The mounting hole is formed longitudinally in the lower end of the base (10), is a blind hole and is mounted securely on the top end of the post. The pivot tongue is formed on the upper end of the base (10), protrudes longitudinally and has two opposite sides and a pivot hole (11). The pivot hole is defined transversely through the tongue.

The pivot bracket (20) is U-shaped, is made of semi-rigid material, is mounted pivotally on the tongue of the base (10)

and has a standoff hole (22), two pivot wings (24), a gap (25) and a stationary compression fitting.

The standoff hole (22) is defined transversely through the pivot bracket (20) and has a diameter.

The pivot wings (24) extend down from the pivot bracket (20) and are mounted pivotally on the opposite sides of the tongue of the base (10). Each pivot wing (24) has an outside surface and a pivot hole (240). The pivot holes (240) are coaxially defined transversely through the pivot wings (24).

The gap (25) is defined between the pivot wings (24), communicates with the standoff hole (22) and causing the diameter of the standoff hole (22) to decrease when the pivot wings (24) are squeezed toward each other.

The stationary compression fitting corresponds to and is formed on the outside surface of one of the pivot wings (24). The stationary compression fitting may be implemented with multiple compression ridges (26) and multiple detents (28). The compression ridges (26) are formed on the outside surface of the pivot wing (24) around the pivot hole (240) adjacent to each other and protrude from the pivot wing (24). Each compression ridge (26) is curved and has an inclined surface (260), a flat outer surface (261) and a flat inner surface (262). The inclined surface (260) has an inner end and an outer end. The flat outer surface (261) is formed at and communicates with the outer end of the inclined surface (260) and is parallel to the outside surface of the corresponding pivot wing (24). The flat inner surface (262) is formed at and communicates with the inner end of the inclined surface (260) and is parallel to the outside surface of the corresponding pivot wing (24). The detents (28) are defined respectively in the flat outer and inner surfaces (261, 262).

The pivot pin (30) is mounted through the pivot holes (240) in the pivot wings (24) and the pivot hole (11) in the tongue of the base (10) to pivotally connect the pivot bracket (20) to the base (10), passes through the stationary compression fitting and has an outer thread (32) and a nut (34). The distal end protrudes through the stationary compression fitting. The enlarged head is formed on the proximal end and abuts the outer surface of the pivot wing (24) opposite to the stationary compression fitting. The outer thread (32) is formed around the distal end. The nut (34) is screwed on the outer thread of the pivot pin (30).

The slip-proof gaskets (12) are mounted on the pivot pin (30) on the opposite sides of the tongue of the base (10) and inside the pivot wings (24). Each slip-proof gaskets (12) has a central hole through which the pivot pin (30) passes.

The compression knob (40) is mounted rotatably around the pivot pin (30) between stationary compression fitting and the nut (34) and has an inside surface, a through hole and a rotatable compression fitting.

The through hole is defined coaxially through the compression knob (40).

The rotatable compression fitting is formed on the inside surface of the compression knob (40), corresponds to the stationary compression fitting on the pivot bracket (20), is in conjunction with the pivot pin (30) and the stationary compression fitting and squeezes the pivot wings (24) together when the compression knob (40) is turned. The rotatable compression fitting on the compression knob (40) corresponds to the previously described implementation of the stationary compression fitting and may be implemented with multiple compression ridges (46) and multiple protrusions (48). The compression ridges (46) are formed on the inside surface of the compression knob (40) around the through hole in the compression knob (40) adjacent to each other, protrude from the compression knob (40) and correspond to the compression ridges (26) on the pivot bracket (20). Each compression ridge (46) is curved and has an inclined surface (460), a flat inner surface (461) and a flat outer surface (462). The inclined surface (460) corresponds to the inclined surface (260) of the compression ridge (26) of the stationary compression fitting and has an inner end and an outer end. The flat inner surface (461) is formed at and communicates with the inner end of the inclined surface (460), is parallel to the inside surface of the compression knob (40) and corresponds to the flat outer surface (261) of the compression ridge (26) of the stationary compression fitting. The flat outer surface (462) is formed at and communicates with the outer end of the inclined surface (460) and corresponds to the flat inner surface (262) of the compression ridge (26) of the stationary compression fitting. With further reference to FIG. 3, the compression knob (40) pulls the pivot pin (30) and presses the stationary compression fitting to squeeze the pivot wings (24) together and grip the tongue on the base (10) when the compression knob (40) is turned to align the flat inner surface (461) with the flat outer surface (261) on the stationary compression fitting. With further reference to FIG. 4, the pivot pin (30) and pressure on the stationary compression fitting are released when the compression knob (40) is turned to align the flat inner surfaces (461) and the flat outer surfaces (462) on the compression knob (40) respectively with the flat inner surfaces (262) and flat outer surfaces (261) on the stationary compression fitting.

The protrusions (48) are formed respectively on the flat inner surfaces (461) and align with and are selectively held in the detents (28) of the stationary compression fitting on the pivot bracket (20).

The standoff rod (50) is mounted slidably through the standoff hole (22) in the pivot bracket (20), holds a musical instrument and is held in place when the pivot wings (24) are squeezed together by the compression fittings and the pivot pin (30). The compression knob (40) is turned to lock the pivot bracket (20) and the standoff rod (50) in position. A single action accomplishes both adjustment tasks. Therefore, adjusting the orientation and position of the musical instrument is simple and quick.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A musical instrument bracket assembly for being mounted on a top end of a post and comprising:
   a base for being mounted on the top end of the post and having
     an upper end;
     a lower end for being mounted on the top end of the post; and
     a pivot tongue formed on the upper end of the base, protruding longitudinally and having two opposite sides and
   a pivot hole defined transversely through the tongue;
   a pivot bracket being U-shaped, made of semi-rigid material, mounted pivotally on the tongue of the base and having
     a standoff hole defined transversely through the pivot bracket and having a diameter;

two pivot wings extending from the pivot bracket, mounted pivotally on the opposite sides of the tongue of the base, and each pivot wing having an outside surface and a pivot hole defined transversely through the pivot wing;

a gap defined between the pivot wings and communicating with the standoff hole; and a stationary compression fitting corresponding to and formed on the outside surface of one of the pivot wings and having multiple compression ridges formed on and protruding from the outside surface of the pivot wing around the pivot hole adjacent to each other, each compression ridge being curved and having an inclined surface having an inner end and an outer end;

a flat outer surface formed at and communicating with the outer end of the inclined surface and being parallel to the outside surface of the corresponding pivot wing; and a flat inner surface formed at and communicating with the inner end of the inclined surface and being parallel to the outside surface of the corresponding pivot wing;

a pivot pin mounted through the pivot holes in the pivot wings and the pivot hole in the tongue of the base, passing through the stationary compression fitting and having a proximal end;

a distal end protruding through the stationary compression fitting;

an enlarged head formed on the proximal end and abutting the outer surface of the pivot wing opposite to the stationary compression fitting;

an outer thread formed around the distal end; and a nut screwed on the outer thread of the pivot pin;

a compression knob mounted rotatably around the pivot pin between the stationary compression fitting and the nut and having an inside surface;

a through hole defined coaxially through the compression knob; and a rotatable compression fitting formed on the inside surface of the compression knob, corresponding to the stationary compression fitting on the pivot bracket and, in conjunction with the pivot pin and the stationary compression fitting and squeezing the pivot wings together when the compression knob is turned, and the rotatable compression fitting having multiple compression ridges formed on and protruding from the inside surface of the compression knob around the through hole in the compression knob adjacent to each other and corresponding to the compression ridges on the pivot bracket, and each compression ridge being curved and having an inclined surface corresponding to one of the inclined surfaces on the stationary compression fitting and having an inner end; and an outer end;

a flat inner surface formed at and communicating with the inner end of the inclined surface, being parallel to the inside surface of the compression knob and corresponding to the flat outer surface of a corresponding one of the compression ridges of the stationary compression fitting; and a flat outer surface formed at and communicating with the outer end of the inclined surface and corresponding to the flat inner surface of a corresponding one of the compression ridges of the stationary compression fitting; and a standoff rod mounted slidably through the standoff hole of the pivot bracket and held in place when the pivot wings are squeezed together by the compression fittings and the pivot pin.

2. The musical instrument bracket assembly as claimed in claim 1, wherein:

the stationary compression fitting on the pivot bracket further has multiple detents defined respectively in the flat outer and inner surfaces; and the rotatable compression fitting on the compression knob further has multiple protrusions formed respectively on the flat inner surfaces and aligning with and selectively held in the detents in the stationary compression fitting on the pivot bracket.

3. The musical instrument bracket assembly as claimed in claim 1, wherein the base further has two slip-proof gaskets mounted on the pivot pin on the opposite sides of the tongue of the base and inside the pivot wings of the pivot bracket, and each slip-proof gasket having a central hole through which the pivot pin passes.

* * * * *